United States Patent
Sanglier et al.

(10) Patent No.: US 9,510,424 B2
(45) Date of Patent: Nov. 29, 2016

(54) METHOD FOR AT LEAST PARTIALLY DECONSTRUCTING A FLAT DISPLAY SCREEN

(75) Inventors: Christophe Sanglier, Argenteuil (FR); Eric Bodevin, La Chaussaire (FR); Olivier Doyen, Nanterre (FR); Paulo Fernandes, Menucourt (FR)

(73) Assignee: VEOLIA PROPRETE, Nanterre (FR)

( * ) Notice: Subject to any disclaimer, the term of this patent is extended or adjusted under 35 U.S.C. 154(b) by 0 days.

(21) Appl. No.: 14/119,965

(22) PCT Filed: Jun. 4, 2012

(86) PCT No.: PCT/FR2012/051245
§ 371 (c)(1),
(2), (4) Date: Feb. 25, 2014

(87) PCT Pub. No.: WO2012/168638
PCT Pub. Date: Dec. 13, 2012

(65) Prior Publication Data
US 2014/0170923 A1    Jun. 19, 2014

(30) Foreign Application Priority Data
Jun. 9, 2011 (FR) .................................. 11 55032

(51) Int. Cl.
*H05B 33/10* (2006.01)
*H01J 9/50* (2006.01)
(Continued)

(52) U.S. Cl.
CPC ................. *H05B 33/10* (2013.01); *B09B 3/00* (2013.01); *H01J 9/50* (2013.01); *H01J 9/52* (2013.01); *Y02W 30/828* (2015.05)

(58) Field of Classification Search
CPC ............ Y02W 30/828; Y02W 30/829; Y10S 248/924; G02F 2203/68; H05B 33/10; B09B 3/00
USPC ................................... 248/220.1, 924; 445/2
See application file for complete search history.

(56) References Cited

U.S. PATENT DOCUMENTS

2005/0239365 A1* 10/2005 Hiraoka .......................... 445/61
2012/0205503 A1*  8/2012 Kobal ............................ 248/121
2013/0035016 A1*  2/2013 O'Donoghue et al. ........... 445/2

FOREIGN PATENT DOCUMENTS

CN        101209453 A    7/2008
JP        2007161550 A    6/2007
(Continued)

OTHER PUBLICATIONS
"How to Replace the Macbook Air Hinges and LCD," retrieved Jun. 12, 2015, published Oct. 8, 2009, retrieved from <http://www.powerbookmedic.com/wordpress/2009/10/08/how-to-replace-the-macbook-air-hinges-and-lcd>.*
(Continued)

Primary Examiner — Anh Mai
Assistant Examiner — Steven Horikoshi
(74) Attorney, Agent, or Firm — Cantor Colburn LLP

(57) ABSTRACT

The invention relates to a method for at least partially deconstructing a flat display screen (10), the screen (10) comprising: —a substantially flat faceplate (11) comprising four side edges and a visible part (12) on a front face of the screen (10), said visible part (12) being intended to display images, —a frame (13) that mounts the faceplate (11) by partially covering at least the front face and two side edges, the method comprising steps of: —disposing (100) a single screen (10) on a holding device (20), and —clamping (110) the single screen (10) to the holding device (20). The method is essentially characterized in that it also comprises a step of: —effecting plastic deformation (120) of the frame (13) while maintaining the integrity of the faceplate (11).

17 Claims, 4 Drawing Sheets

(51) Int. Cl.
    *H01J 9/52*     (2006.01)
    *B09B 3/00*     (2006.01)

(56) References Cited

FOREIGN PATENT DOCUMENTS

| | | |
|---|---|---|
| JP | 2011006425 A | 1/2011 |
| WO | 2007122728 A1 | 11/2007 |

OTHER PUBLICATIONS

"MacBook Unibody Model A1342 Rear Display Bezel Replacement," retrieved Jun. 12, 2015, published Jun. 29, 2010, retrived from <https://www.ifixit.com/Guide/MacBook+Unibody+Model+A1342+Rear+Display+Bezel+Replacement/3011>.*

Macbook 13" Repair—LCD Display Screen Replacement Removal Disassembly, [video], Powerbook Medic, uploaded Oct. 1, 2008, [retrieved Feb. 24, 2016], Retrieved from <https://www.youtube.com/watch?v=slyz-ahXgRk>.*

Addendum including enlarged Figures from previously cited MacBook Unibody Model A1342 Rear Display Bezel Replacement, published Jun. 29, 2010, [retrieved Jun. 12, 2015], retrieved from <https://www.ifixit.com/Guide/MacBook+Unibody+Model+A1342+Rear+Display+Bezel+Replacement/3011>.*

International Search Report for corresponding application PCT/FR2012/051245 filed Jun. 4, 2012; Mail date Nov. 5, 2011.

Written Opinion for corresponding application PCT/FR2012/051245 filed Jun. 4, 2012; Mail date Nov. 5, 2011.

* cited by examiner

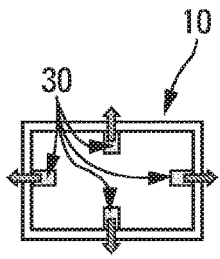 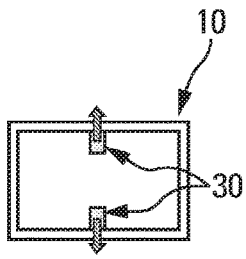 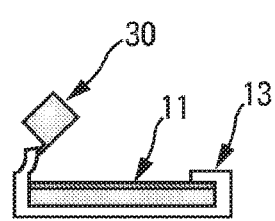
Fig. 5A   Fig. 5B   Fig. 7
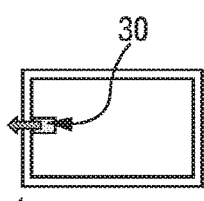 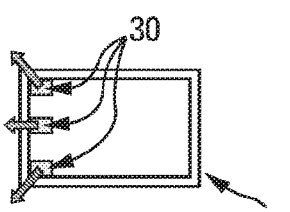
Fig. 5C   Fig. 5D
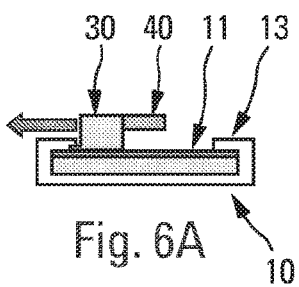 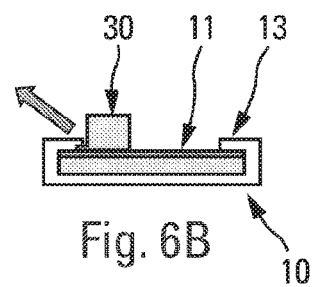
Fig. 6A   Fig. 6B
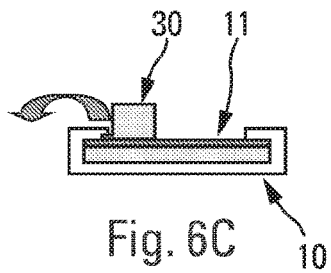 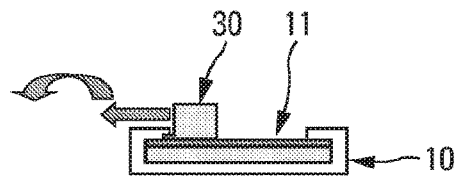
Fig. 6C   Fig. 6D
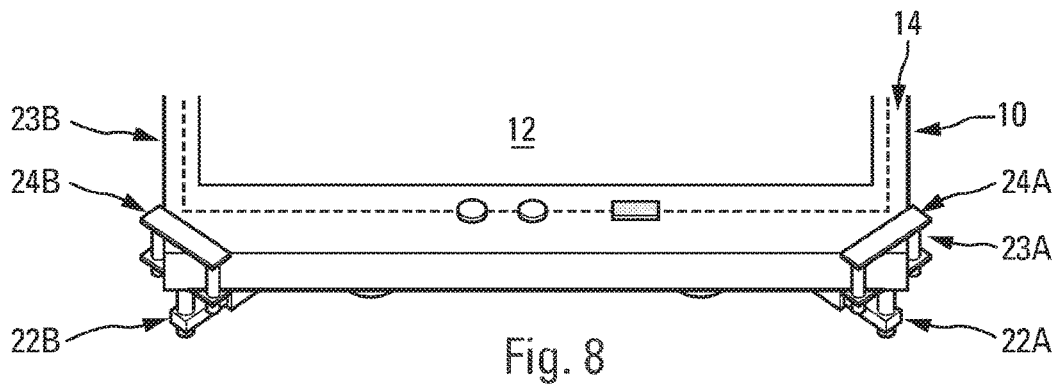
Fig. 8

METHOD FOR AT LEAST PARTIALLY DECONSTRUCTING A FLAT DISPLAY SCREEN

TECHNICAL FIELD

The present invention relates to the deconstruction that is to say the dismantling of flat screens.

BACKGROUND

It applies to any types of screen, whether it be screens with a liquid crystal panel (LCD Liquid Crystal Display) and backlight lamps (CCFL, LED or other) or other types of displays, such as:
Plasma
OLED (organic light emitting diode)
SED (Surface-conduction Electron-emitter Display)
FED (Field Emission Display)
OEL (Organic Electroluminescent)
PLED (polymer light-emitting diodes)
PHOLED (Phosphorescent Organic Light-Emitting Diode)

In order to destroy or decontaminate these flat screens at the end of life, there are industrial methods of at least partially grinding these screens during which the faceplate and/or the backlight lamps are usually destroyed or partially damaged. Hence, such methods can cause the release of gases and toxic substances, such as mercury, for example, in the air, on the ground, or in direct contact with constituents of the screen that are liable to be recycled. However, the mercury that is released tends to pollute the other screen members, such as plastic which becomes difficult to recycle. These methods are hence responsible for some pollution and substantially increase the difficulty of recovering any recoverable components, particularly liquid crystals, and metals, particularly indium from the screen.

At present, the existing solutions consist in crushing the screen and drawing out the toxic gaseous elements, or dismantling the screen entirely manually, which is not satisfactory in terms of environmental protection, and in terms of productivity.

BRIEF SUMMARY

The purpose of the present invention is to overcome these drawbacks by proposing a solution aiming to preserve the integrity of the faceplate of a flat screen as much as possible.

More specifically, the invention relates to a method of deconstructing at least partially a flat display screen, the screen comprising:
a substantially plane faceplate, comprising four lateral edges and an visible portion on a front side of the screen intended for image display, and
a frame, mounting the faceplate by partially covering at least the front side and two lateral edges,
the method comprising steps including:
placing a single screen on a holding device, and
clamping the single screen on the holding device.

According to the invention, the method is substantially characterized in that it further comprises a step including:
carrying out a plastic deformation of the frame, while maintaining the integrity of the faceplate.

Thanks to this characteristic, it is possible to avoid cutting the frame. This makes it possible to open the screen while avoiding aggressive industrial techniques and which generate waste (in particular non-recoverable). In particular, cutting leads to:
many vibrations in the screen (which can lead to the damage of fragile members such as mercury lamps)
generates a lot of dust, gas and chips, and
induces consumables (a cutting tool has a limited life).

In one embodiment, the method further comprises a step of weakening of the frame by mechanical action and/or heat on the frame.

Thus allowing to limit the forces to be applied for deforming the frame.

Preferably, the weakening step is only implemented on all or part of the portion of the frame which partially covers the front side of the screen.

In one embodiment, at least two out of the four corners of the screen are clamped, the plastic deformation being performed on an unclamped corner.

In one embodiment, the method further comprises a step of determining the dimensions and the position in space of the visible faceplate.

This then allows to subject the efforts to be applied to the determined dimensions.

In one embodiment, the method further comprises a step of laser profilometry including obtaining the three-dimensional topography of at least one portion of the screen.

Thus allowing for an optical tracking of the screen, that is to say, a shape analysis thereof.

In one embodiment, the method further comprises a step comprising removing the faceplate from the frame.

The invention further relates to a device for holding a flat display screen for at least its partial deconstruction, the device comprising:
a clamping system comprising:
a support, whereon a screen is likely to be positioned,
a set of independent branches mounted on the support,
a flange positioned at the end of each branch.

Preferably, each flange is rotatably mounted with respect to the branch which supports it, according to an axis of rotation perpendicular to the plane of the support, and/or each branch is mounted in rotation with respect to the support, according to an axis of rotation perpendicular to the plane of the support.

Advantageously, each branch is telescopic.

The invention is advantageously compatible with all screens, whatever their status (new or used), size (dimensions of the faceplate), their weight and their material(s) of manufacture.

The invention also relates to a system for at least the partial deconstruction of a flat display screen, the system comprising
a holding device according to the invention,
possibly a screen positioned in the holding device, and
a plastic deformation device liable to be set in relative motion with respect to the screen such as to exert a mechanical force on the frame in order to deform it according to at least one of the following trajectories: a rectilinear trajectory parallel with the plane of the faceplate, a rectilinear trajectory non parallel with the plane of the faceplate, a curved trajectory, or a combination of these movements.

Preferably, the plastic deformation device comprises
a knife and
possibly a rotating force transmission means, connected to the knife,
the knife comprising a form making it possible to concentrate the constraints to be applied to the frame.

Advantageously, the knife exhibits a leading edge that is configured to switch between the faceplate and the frame.

The knife may have a leading edge exhibiting a variable opening angle on the depth of the knife.

It can also be provided a camera to view on the console of an operator the proceedings of the application of the plastic deformation forces.

Thanks to the invention, it is possible to move aside at least one side of a screen by deforming the frame thereof, this makes it possible to remove the faceplate and any possible filters/diffusers, as well as give access to any possible backlight lamps.

BRIEF DESCRIPTION OF THE DRAWINGS

Other characteristics and advantages of the present invention will become apparent upon reading the following description given by way of illustrative and non-limiting example and with reference to the accompanying drawings in which:

FIGS. 5A to 5D illustrate in top view, by full arrows, the different knife movements for the deformation of the frame of a screen with a knife (FIG. 5C), two knives (FIG. 5B), three knives (FIG. 5D), and four knives (FIG. 5A), FIGS. 6A to 6D illustrate in transversal cross-section by full arrows, different movements of translation and/or rotation for a knife, applied on the frame, the casing not being represented, FIG. 7 illustrates in transversal cross section the result of plastic deformation by a knife on the frame of a flat screen, wherein the casing is not represented, FIG. 8 illustrates in substantially top view the clamping of a screen in an embodiment of a holding device according to the invention, wherein the flanges do not cover the faceplate, the dots illustrating the limits of the faceplate concealed by the casing.

DETAILED DESCRIPTION

These days, there are flat screens in many fields: computer monitors, televisions, tablet PCs, navigation devices, etc.

For environmental reasons, it is desirable that all flat screens be deconstructed at the end of life, in order to make the treatment of their components possible, particularly their recovery.

All flat panel screens include a faceplate, which allows for the display on the front side of the screen.

By faceplate 11 or matrix, is meant the generally rectangular portion of a flat screen 10 whereon the image is formed. For an LCD screen 10, the polluting elements are the liquid crystals enclosed between two fine glass plates and which allow for the formation of the image.

Certain flat screens comprise backlight lamps, placed behind the faceplate 11 with respect to the display. Some lamps may also contain polluting elements (for example, mercury).

The faceplate 11 is contained in a frame 13.

The frame 13 is generally made of metal and has a function of maintaining the constitutive members of the screen, particularly the faceplate.

The faceplate 11 and the frame 13 are housed in a casing 14.

The casing 14 is generally made of plastic, of globally parallelepiped shape and has a generally aesthetic function of concealing the structural members such as the frame 13 and/or the possible seals, connectors, etc. which would otherwise be apparent. It also covers the rear side of the screen.

The mechanical resistance of the frame 13 being greater than that of the casing 14, the plastic deformation aimed for here relates to that of the frame, any plastic deformation of the frame 13 causing that of the casing 14.

Figure 1:
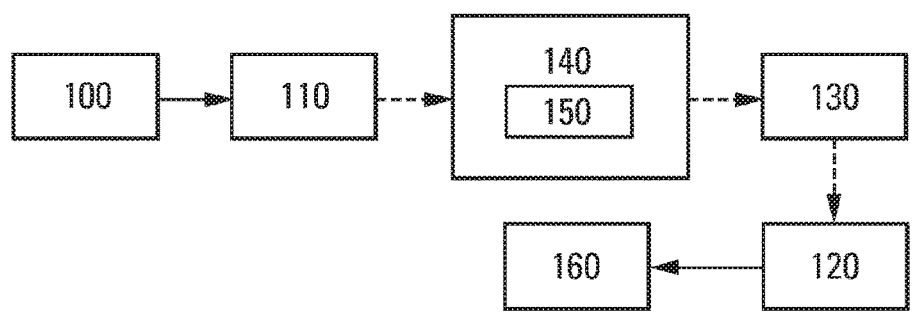
FIG. 1 illustrates one embodiment of the method according to the invention, wherein the optional steps are in dotted lines.
Figure 2A:
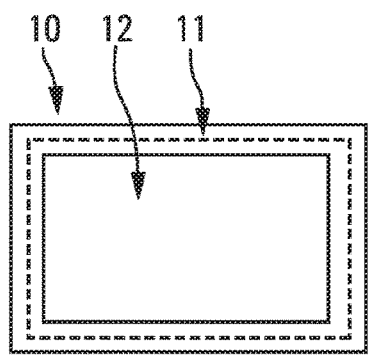
FIG. 2A illustrates a front view of a flat screen.

The casing 14 has a substantially rectangular opening (window) whereof the dimensions are slightly lower than the dimensions of the surface of the faceplate, such that the faceplate 11 has a visible portion, called "visible faceplate 12" (FIG. 2A), and a portion concealed under the casing. The casing 14 encloses the faceplate 11 by securely covering the edges thereof.

For the treatment of flat screens, with a view to their recovery, it is important to maintain the integrity at least of the faceplate, and possibly of the backlight lamps. Integrity is considered to be kept as long as the damage subjected to a screen 10 does not allow the release of polluting elements. In this vein, it can be considered for example that the faceplate 11 may be scratched.

The advantage of keeping the integrity is that the pollutant suction devices can be used only by way of precaution in the event of an accident for example, and not for every dismantling of each screen 10 as in the prior art.

Method

It can be provided a preliminary step of preparing the screen 10, comprising removing the possible stand of the screen, removing possible cables or aesthetic elements (stickers, etc.).

It is provided a step 100 comprising arranging a single screen 10 on a holding device, preferably the visible faceplate 12 towards the top, that is to say, directly accessible to an operator or a robot. The holding device 20 has for function to maintain the screen 10 whatever the operations to be carried out on the screen. In particular, it comprises flanges 23 capable of withstanding mechanical tension. Therefore, the screen 10 and the holding device 20 become integral for the deconstruction of the screen after clamping 110.

The holding device 20 comprises at least two flanges 23A, 23B, 23C, 23D, each flange preferably being taken on a respective corner of the screen. For each corner, it is sufficient to tighten the screen 10 for example from the top (front side of the screen), from below (rear side of the screen) and from both sides (lateral sides of the screen) of the corner in order to maintain it. In this case, the screen 10 is maintained stationary with at least two flanges arranged on two opposite corners (diagonally on the screen).

In operation, for a better hold of the screen, three out of the four corners of the screen can be clamped. Consequently, plastic deformation actions can be carried out on the fourth corner (unclamped) without risk of damaging the flange.

It is provided a step 140 of determining the dimensions and position of the visible faceplate 12. This makes it possible to define the straight lines (in three dimensions in a given reference), each corresponding to the intersection between the inner edges of the casing 14 and the plane of the faceplate, such as to correctly position the knives in a later step.

To this end, a possibility is offered by the holding device 20 itself: for example, the measured spacing of the flanges holding the screen 10 provides information about the height or the outer width of the screen. Thus, making it possible to roughly locate the corners of the screen. One can further position a camera 50 over one of the corners.

Laser Profilometry

Another possibility is offered by laser profilometry 150 of the screen.

Laser profilometry concerns obtaining the (three-dimensional) topography of one portion at least of the screen. A laser projects a plane beam resulting in a line of light on an area of the screen. The laser is inclined at a given angle, for example 30° to 45°, with respect to the optical axis of a camera (possibly the same camera 50) which scans an area where the laser line is projected and reflected in the direction of the camera such as to image the deformations of the line due to the relief, that is to say, the geometry of the screen 10 (casing, buttons, etc.). Preferably, the optical axis of the camera or the laser plane is orthogonal to the faceplate.

The movement of the camera is integral with the laser movement, for example by both being carried by a robotic arm (not illustrated). This arm makes it possible to produce a movement of translation (scanning) of the camera-laser assembly particularly parallel to the faceplate.

The observation by the camera of the deformed laser line makes it possible, thanks to a prior calibration of the camera-laser system and the implementation of an image processing algorithm well known in the field, to know the 3D coordinates in a coordinate system (for example that of the robot) of each point of relief of the screen having been scanned by the camera-laser assembly.

Advantageously, it is not necessary to recreate a complete representation of the relief of the screen, but only to have knowledge of at least the coordinates of certain characteristic points.

The laser line can be scanned (automatically) on the four sides of the screen, such as to determine the characteristic points corresponding to the transition points between the faceplate 11 and the casing 14 of the screen, that is to say such as to define the contour (perimeter) of the visible faceplate 12.

This step of laser profilometry 150 makes it possible to locate the surface of the faceplate in space with respect to a given reference and also to check the state of flatness and possible degradation of the surface of the faceplate 11, and emit an alarm or remove a screen 10 from the deconstruction circuit if need be.

Weakening

For the plastic deformation 120 of the frame, significant mechanical forces are exerted thereon. However, the constraints are mainly focused on the corners of the frame. Therefore, it can be provided a step 130 comprising weakening the frame 13, particularly the corners thereof.

The step of weakening makes it possible to reduce mechanical resistance upon plastic deformation of the frame, that is to say of the material(s) composing it or the junction between these materials in a corner of the frame. Hence, it makes it possible to decrease the mechanical forces required to plastically deform the frame 13—hence of the opening of the screen 10—and makes it possible to promote a possible breakage of the frame 13 on the weakened areas.

This weakening 130 can be achieved by removing material, modifying the form or physical properties of the frame. Several solutions are possible.

by mechanical action:

it may be provided a machining of the frame, particularly of the corners, using an abrasive tool (grindstone, cutter, drill). It may also be provided a partial cut of the frame, particularly the corners, with a cutting tool (circular saw, cutting tool, . . . )

by thermal action:

it may be provided cryogenic treatment of the frame 13 to make it more breakable, or the heating of the frame 13 to reduce its mechanical strength.

Figure 2B:
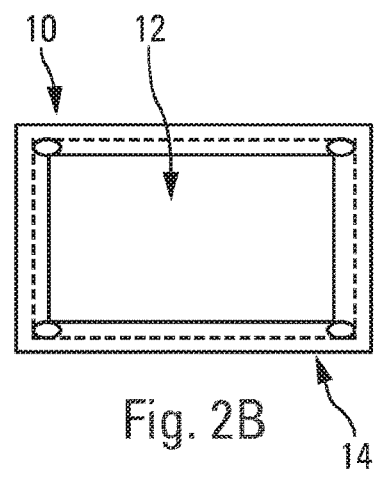
FIG. 2B illustrates a front view of a flat screen with circular areas illustrating preferential areas of weakness of the frame.

It can be provided to drill the corners of the frame 13 covering the faceplate (FIG. 2B), without damaging the faceplate 11. The drilling may be on all or part of the thickness of the frame 13 covering the faceplate.

It can be provided that the weakening step 130 precedes the plastic deformation step 120.

It can be provided that the weakening step 130 and plastic deformation step 120 be simultaneous, also for example, thanks to the shape of a tool 30 described later.

The weakening step 130 makes it possible to deform, cleave, split, crack, or break the frame.

The mechanical forces to be applied (force and/or torque) for the plastic deformation of the frame, serve to release the faceplate 11 from the frame 13 which maintains it. Hence, it is possible to only weaken the frame 13 on the part covering the faceplate 11 (front side of the screen), particularly in the corners.

For the plastic deformation of the frame, the mechanical forces are applied by a plastic deformation device.

Plastic Deformation Device

The plastic deformation device comprises a knife 30 connected to a means 40 for transmitting a force, for example a jack, possibly rotatable.

By knife, also known as a wedge is meant an instrument or oblique-sided mechanical piece of essentially prismatic shape whereof two main sides, in this case a leading edge 31, or ridge, intersect at a sharp angle. Unlike cutting tools that require sharpening, the knife 30 is a tool of force concentration. Furthermore, the implementation of the knife 30 aims to deform the frame, possibly until it breaks. It is thus not only distinguished from cutting techniques but further by degree of precision that they require.

Figure 4A:
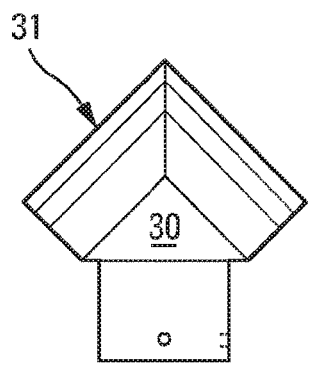
FIG. 4A illustrates one embodiment of a knife according to the invention in top view, FIG. 4A' illustrates the knife of FIG. 4A in side view.
Figure 4A:
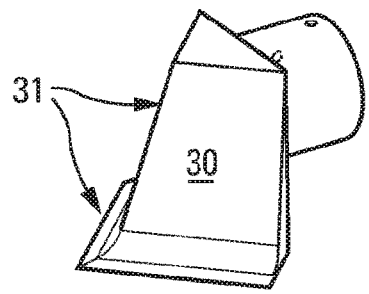

The shape of the knife 30 (FIGS. 4A, 4A', 4B, 4B', 4C, 4C') makes it possible to focus the constraints transmitted by the jack on the leading edge 31, which serves to concentrate the mechanical forces. Preferably, the shape of the leading edge 31 is rectilinear and substantially perpendicular to the plane of the faceplate or has a sharp angle ranging between 45 and 90° with respect to the plane of the faceplate (FIGS. 4A', 4C').

In one embodiment that is non-illustrated, the knife 30 comprises along its entire length a rectilinear groove extending along an axis of elongation parallel to the plane of the screen and the frame, that is to say, orthogonal to the travelling direction of the knife, such that the frame can be inserted in said groove and be in abutment with the edges thereof during the pushing movement of the knife, thereby constraining the elastic or plastic deformation of the frame.

Figure 4B:
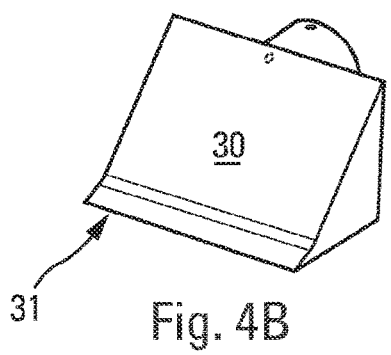
FIG. 4B illustrates an embodiment of a knife according to the invention in three-quarter view, FIG. 4B' illustrates the knife of FIG. 4B in side view.
Figure 4B:
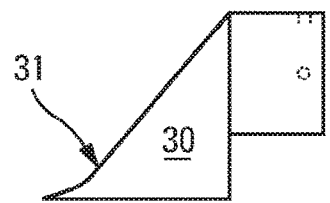

The leading edge 31 can be configured to switch between the faceplate 11 and the frame 13 (particular FIGS. 4B, 4B'). It makes it possible for example to be put in contact with the frame 13 during the initial positioning (see below), and remain in contact with the frame 13 when applying force. It makes it possible to exert a spacing and distorting function of the frame 13 with respect to the faceplate 11.

The leading edge 31 may be, in combination (FIGS. 4A', 4C') or alternatively configured to pass between two adjacent sides of the frame, that is to say to concentrate the mechanical forces in a corner thereof.

The leading edge 31 may have a weak opening angle (less than 45°) and be extended by a thicker part (whereof the opening angle is larger. This shape makes it possible to lift the frame 13 (upon applying a mechanical force parallel with the plane of the faceplate) and lock the frame 13 on the knife, enabling a better thrust during the movements thereof. The angle of incidence 31 may vary switching for example from 25° on the drive line 31 to 50° after a few millimeters. The portion in contact with the faceplate 11 is flat, such as to slide more easily on the faceplate without causing jamming or damage to the integrity of the faceplate.

The knife 30 can have several forms:
  a flat effective area, practical during the spacing of the flat portions of the frame (FIGS. 4B, 4B'),
  a flat effective area with a sharp corner (FIGS. 4A', 4C') or in curved or rounded form (not represented) practical during the spacing of the corners of the frame,
  an area with several geometries (flat and/or sharp and/or curved corner . . . ), to be taken from any location of the frame 13 (form not represented).

Figure 4C:
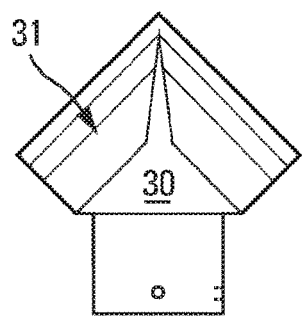
FIG. 4C illustrates one embodiment of a knife according to the invention in top view, FIG. 4C' illustrates the knife of FIG. 4C in three-quarter view.
Figure 4C:
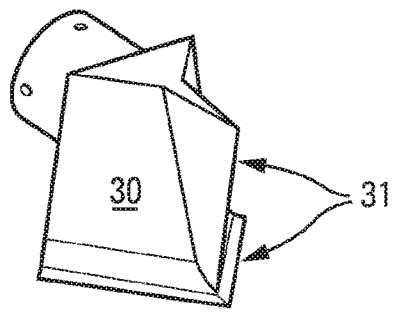

Depending on the form of the knife 30, the weakening step 130 and the plastic deformation step 120 can be implemented not only simultaneously but further with a single tool, in this instance the plastic deformation device comprising the knife 30. For example, as illustrated in FIG. 4C', the leading edge 31 non parallel with the plane of the faceplate makes it possible to weaken the frame by focusing forces. The two main sides, that is to say the flanks on either side of this leading edge 31 make it possible to plastically deform the frame during the relative movement between the knife 30 and the frame.

Initial Position

Before applying the mechanical forces required for the plastic deformation of the screen, the plastic deformation device is manually and/or automatically placed in initial position, by a relative movement between the latter and the screen 10 (the screen 10 being preferably maintained).

Preferably, in the initial position, the plastic deformation device is in contact with the frame 13 or the casing 14 of the screen.

Plastic Deformation

Once placed in the initial position, the plastic deformation device is brought in relative movement with respect to the screen 10 such as to exert a mechanical force (force and/or torque) on the frame 13 to deform it (FIG. 5A to 5D).

The relative movement may be implemented according to at least one of the following trajectories: a rectilinear trajectory parallel with the plane of the faceplate (FIG. 6A), a rectilinear trajectory non parallel with the plane of the faceplate (FIG. 6B), a curved trajectory (FIG. 6C) or a combination of these movements (FIG. 6D).

A curved trajectory allows for example to raise the portion of the frame 13 covering the front side of the faceplate 11 with a rotational movement of the knife 30 with respect to an axis of rotation parallel to the side of the screen 10 whereon the plastic deformation is implemented (FIG. 7).

The plastic deformation of the frame 13 makes it possible to deform the frame hence, to release the faceplate 11 from the screen. The deformation is relative and even proportional with the force applied by the knife 30 connected to a force transmission means 40. It can be provided that the plastic deformation will cause to the mechanical rupture of the frame.

The plastic deformation is not a cutout from the frame. Advantageously, the knife 30, even from metal does not need to be particularly sharp. And compared to the cutout solutions requiring precision and special mastery, the present solution is easier to implement and less costly since the knife 30 is not a consumable item as is a saw blade for example.

It is worth noting that during deformation, one or several knives (identical or not) can be used on a same screen simultaneously or sequentially. The relative movements of each knife 30 may be independent: each knife 30 can have a similar or different movement to/from one another.

Typically, after the measurements of the dimensions of the position of the screen 10 by laser profilometry 150, a computer algorithm determines the trajectories (movement) of each knife 30 (direction, way, angle of rotation, starting point and the point of arrival of the movement of the knife by means of the jack 40).

In accordance with the determined trajectories, a robot then manipulates the knife or knives, which has for effect to open the frame 13 of the screen 10 by plastic deformation of the frame.

For example, the knife 30 carries out a translation of a few centimeters in the plane of the faceplate, then a rotation of 90° around the axis parallel to the edge of the screen 10 whereon the knife 30 is performing the deformation, such as to raise the edge, which is hence no longer above the faceplate.

The same operation can be carried out over the entire length of the frame, so that a whole side of the frame 13 be entirely open. The same operation can be performed on each side of the frame.

The flange system of the holding device 20 can be applied at any point that is not on the trajectory of the knife.

Check

It can be provided at least a camera (for example the camera 50) to view and/or control on the console of an operator the proceedings of the application of the plastic deformation forces. The operator may then validate the step of plastic deformation or invalidate it, for example via a push button.

In case of validation that is to say when the frame 13 has been sufficiently open to be able to remove the faceplate, the faceplate 11 may then be removed 160 from the frame.

In case of invalidation, a new sequence of deformation can be applied, for example by modifying the parameters representative of force, or the stroke length of the knife.

Holding Device

The holding device 20 comprises at least one flange 23.

The flange 23 is taken on one side of the screen, preferably by remaining as far as possible from the visible faceplate 11 (FIG. 8). It can also be taken behind and/or in front, as long as it does not hinder the execution of the method.

The flange 23 can be fixed on a stationary support (for example a table) and/or a mobile system able to move (for example a robot).

In the case where the flange 23 and hence the screen 10 held therein, is mounted on a mobile system, the position of the flange in space is always known. Thereby, the position of the screen 10 in space is also known.

For the flange, it can be provided a mechanical clamping system, a suction system, a magnetic system, a system based on adhesive material, or a combination of these possibilities.

In one embodiment (FIG. 11), the holding device 20 comprises a set of plates 24 (drilled at each end) and screws, each set of plates and screws acting as flanges.

Figure 11:
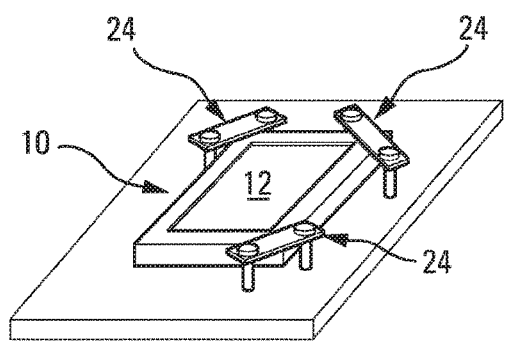
FIG. 11 illustrates the holding of a screen on a support according to another embodiment of a holding device according to the invention.

The screen 10 is maintained by two or three plates 24 each screwed to a corner of the screen 10 on a special table, of machining table type (that is to say, with special mobile notches to place and tighten the screws so that they be stationary through tightening) at multiple points (FIG. 11).

The dimensions of the plates are preferably selected such that they press on the screen 10 without covering the visible faceplate 12 and preferably without also covering the faceplate 11 concealed under the casing.

Preferably, the screws crossing each plate are in contact with the screen.

In an embodiment (FIG. 3), the screen 10 is maintained by a (possibly automatic) clamping system.

Figure 3:
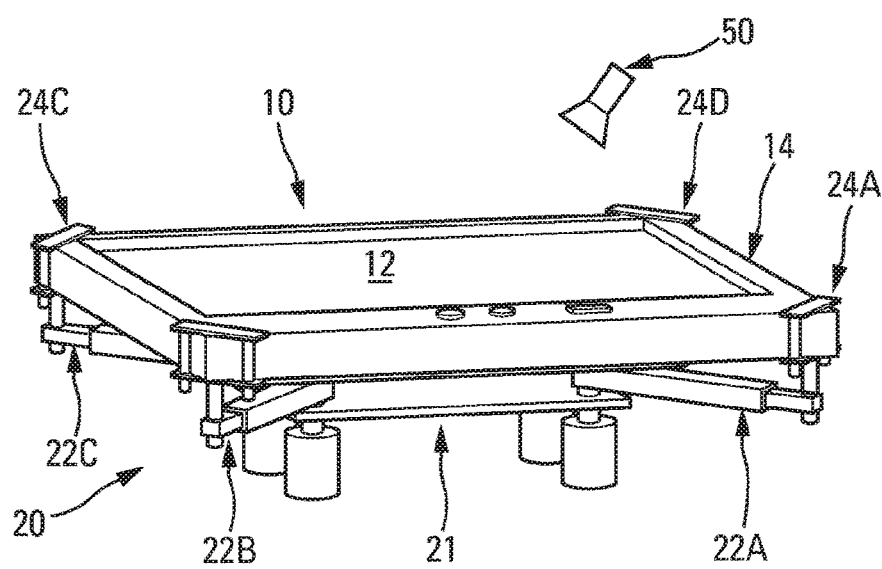
FIG. 3 illustrates a flat screen maintained in an embodiment of a holding device according to the invention, in a three-quarter view.
Figure 9:
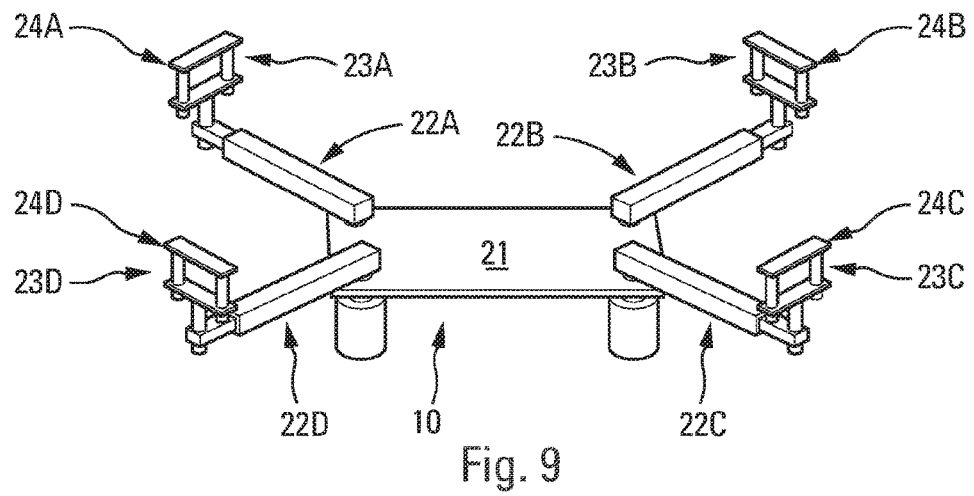
FIG. 9 illustrates an embodiment of a holding device according to the invention.

An embodiment of the clamping system is illustrated in FIG. 9, maintaining a screen 10 in the latter being illustrated in FIG. 3.

Figure 10:
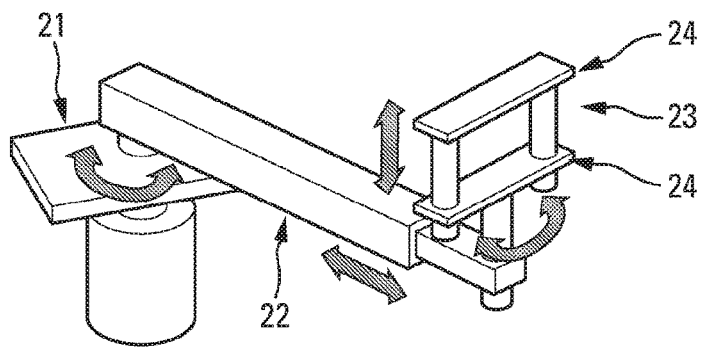
FIG. 10 illustrates by full arrows the possible movements of translation and rotation for an arm of an embodiment of a holding device according to the invention.

The clamping system comprises:
- a support 21 able to be mounted on a mobile tool (for example a robot),
- a set of branches 22A, 22B, 22C, 22D independent from each other and mounted on the support 21, typically three or four branches. Preferably, each branch is mounted in rotation with respect to the support, according to an axis of rotation perpendicular to the plane of the support. Preferably, each branch is telescopic in order to be able to modify its length (FIG. 10),
- a flange 23A, 23B, 23C, 23D positioned at the end of each branch. Preferably, in order to be able to orient it, each flange is mounted in rotation with respect to the branch which supports it, according to an axis of rotation perpendicular to the plane of the support. Each flange comprises two plates 24 mobile with respect to each other thanks to two screws. The tightening of the flange is carried out for example thanks to a relative rectilinear movement of the two plates with respect to one another.

It can be provided that each flange 23 (set plate+screw) is adjustable in height with respect to the respective branch 22 which supports it, for example by means of a helical connection between the flange 23 and the branch 22 or of a sliding pivot joint lockable in translation by means of a stop pin in translation of the flange 23 with respect to the branch 22 which supports it. This last feature allows for the clamping device to be able to receive and clamp any type of screen, regardless of its length, width, or depth.

In order to maintain a 10 screen with such a holding device, it is provided on a given arm:
- First, the arm is moved away, for example by extending it to a maximum,
- The screen 10 is positioned on the support, faceplate 11 upwards,
- The arm undergoes a rotation in order to be parallel to a diagonal of the screen,
- The arm is retracted, such that the screws of the flanges are pressed on a corner, thanks to a rotation of the flange,
- The clamp is tightened, thereby blocking the screen 10 by the corner.

Such a holding device 20 can be adapted to all screen sizes.

Once the screen 10 is clamped, the step of laser profilometry 150 can be for example implemented.

Withdrawal of the Faceplate

Once the plastic deformation carried out, the faceplate 11 is no longer maintained by the frame. The flange may be removed.

The withdrawal operation 160 may be performed by an operator and/or an automated mobile system (robot).

The only remaining links between the faceplate 11 and the rest of the screen 10 are usually flexible electronic cards and/or cables. These various links can be cut or broken, including during the removal of the faceplate, thanks to a fairly rapid movement and/or with enough force.

During this action, little or no force is applied on the members placed behind the faceplate 11: filters and diffusers, possible backlight lamps, electronic cards, etc. Thus, making it possible to maintain their integrity.

The faceplate 11 can be removed from the frame 13 in several ways:
- the faceplate 11 is drawn along a trajectory comprising an initial movement in a direction substantially perpendicular to the plane of the frame 13 (before deformation), for example by suction cups,
- the faceplate 11 can be removed by sliding it along the screen 10, like a sheet of paper being removed from an envelope,
- the faceplate 11 can be lifted by a lever, thanks to a lever tool such as a screwdriver, spatula, etc. Once lifted, the faceplate 11 can be manipulated manually or by an automated system with a gripping tool that is non-aggressive for the faceplate 11: suction cup, pliers, venturi effect, . . .
- the screen can be turned around to remove the faceplate 11 by gravity.

For example, an operator places a flat tool (of screwdriver type) between the faceplate 11 and the deformed frame 13. The operator brings the flat part of the tool under the faceplate 11 and by leverage effect, lifts the faceplate. Thus, he can without moving the screwdriver in his hand, grab the faceplate 11 with the other hand and remove it. The frame 13 having been deformed such that the opening created by the deformation be greater than the faceplate, this operation is simple to implement and does not pose any particular risk for the faceplate, the operator or the other members of the screen.

The faceplate 11 having been withdrawn, the operator can, in the same manner, remove the filters and diffusers under the faceplate.

Once the faceplate 11 removed, the rest of the screen 10 may undergo another deconstruction treatment. In particular, the screen 10 may undergo a method of removing the backlight lamps.

The invention claimed is:

1. A method for at least partially deconstructing a flat display screen, the screen comprising:
    a substantially plane faceplate, comprising four lateral edges and an visible portion on a front side of the screen intended for image display,
    a frame, composed by only one part, mounting the faceplate by partially covering at least the front side and two lateral edges, said faceplate being contained in said frame,
    the method comprising:
    placing a single screen on a holding device,
    clamping the single screen on the holding device, and
    carrying out a plastic deformation of the frame by contacting a tool of force concentration with the faceplate, while maintaining the integrity of the faceplate, said tool of force concentration being in contact with said faceplate and with said frame.

2. The method according to claim 1, further comprising a step of weakening of the frame by mechanical and/or thermal action on the frame.

3. The method according to claim 2, wherein the step of weakening is only implemented on all or part of the frame partially covering the front side of the screen.

4. The method according to claim 1, wherein at least two out of the four corners of the screen are clamped, the plastic deformation being performed on an unclamped corner.

5. The method according to claim 1, further comprising a step of determining the dimensions and the position in space of the visible faceplate.

6. The method according to claim 1, further comprising a step of laser profilometry comprising obtaining the three-dimensional topography of at least a portion at least of the screen.

7. The method according to claim 1, further comprising a step of removing the faceplate from the frame.

8. The method according to claim 1, wherein the holding device comprises:
    a clamping system comprising:
        a support configured to hold a display screen,
        a set of independent branches mounted on the support,
        a flange positioned at the end of each branch.

9. The method according to claim 8, wherein each flange is mounted rotatably with respect to the branch which supports it, according to an axis of rotation perpendicular to the plane of the support; and/or each branch is mounted rotatably with respect to the support, according to an axis of rotation perpendicular to the plane of the support.

10. The method according to any one of claim 8, wherein each branch is telescopic.

11. A system for deconstructing at least partially a flat display screen, the system comprising
    a holding device for holding a flat display screen for at least the partial deconstruction thereof including a clamping system, wherein the clamping system comprises:
    a support, configured to hold a display screen,
    a set of independent branches mounted on the support,
    a flange positioned at the end of each branch,
    a single screen positioned in the holding device, and
    a plastic deformation device in contact with a faceplate of the flat display screen and with a frame of the flat display screen, the plastic deformation device being liable to be set in relative movement with respect to the screen such as to exert a mechanical force on the frame of the flat display screen, said frame is composed by only one part and said faceplate being contained in said frame, in order to deform it according to at least one of the following trajectories: a rectilinear trajectory parallel with the plane of the faceplate, a rectilinear trajectory non parallel with the plane of the faceplate, a curved trajectory, or a combination of these movements.

12. The system according to claim 11, wherein the plastic deformation device comprises
    a tool of force concentration and
    possibly a rotating force transmission means, connected to the tool of force concentration,
    the tool of force concentration comprising a form making it possible to concentrate the force to be applied to the frame.

13. The system according to claim 12 wherein the tool of force concentration exhibits a leading edge configured to pass between the faceplate and the frame.

14. The system according to claim 12 wherein the tool of force concentration exhibits a leading edge having a variable opening angle on the depth of said tool.

15. The system according to any one of claim 12, further comprising a camera to view and/or control on the console of an operator the proceedings of the application of plastic deformation forces.

16. A system according to claim 11, wherein each flange is mounted rotatably with respect to the branch which supports it, according to an axis of rotation perpendicular to the plane of the support; and/or each branch is mounted rotatably with respect to the support, according to an axis of rotation perpendicular to the plane of the support.

17. A system according to claim 16, wherein each branch is telescopic.

* * * * *